Oct. 13, 1964   G. F. MORRISON ETAL   3,152,608
CHECK VALVE
Filed Jan. 15, 1962
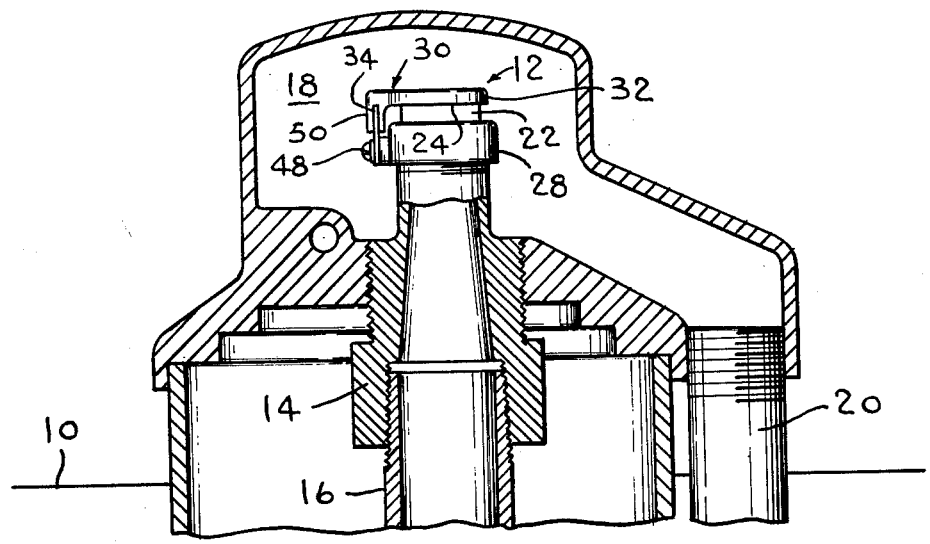
Fig. 1
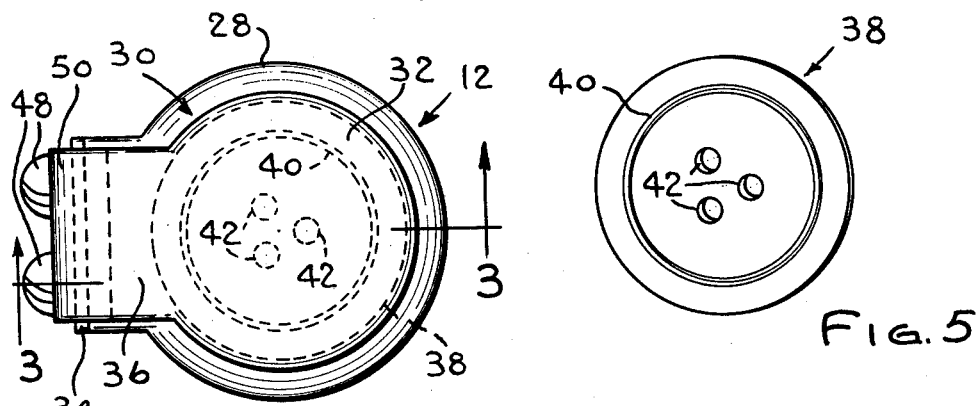
Fig. 2
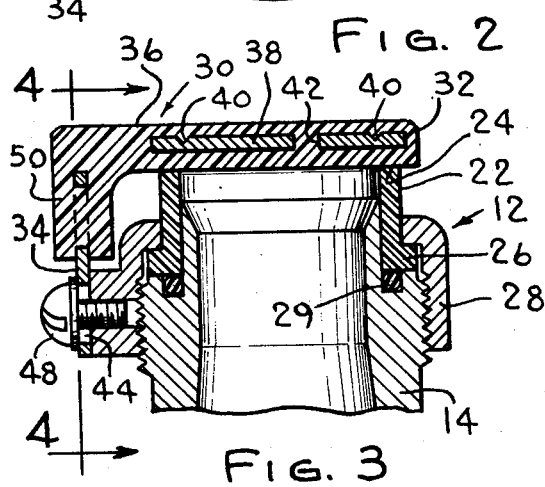
Fig. 3
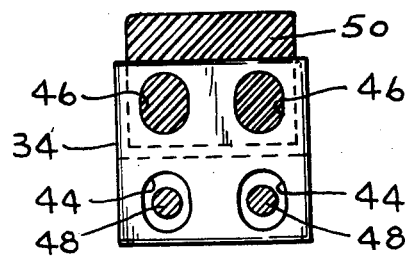
Fig. 4
Fig. 5
INVENTORS
GEORGE F. MORRISON
HERMAN C. FRENTZEL
BY Bayard H. Michael
ATTORNEY

United States Patent Office 3,152,608
Patented Oct. 13, 1964

3,152,608
CHECK VALVE
George F. Morrison, Fox Point, and Herman C. Frentzel, Milwaukee, Wis., assignors to The Morrison Company, Milwaukee, Wis., a corporation of Wisconsin
Filed Jan. 15, 1962, Ser. No. 166,334
6 Claims. (Cl. 137—525.3)

This invention relates to a check valve which is an improvement over the check valve disclosed in our copending application Serial No. 74,502 now Patent No. 3,095,928 for a "Well System" filed on December 8, 1960 and assigned to the assignee of this application. In the water system of the type disclosed in that application, the valve is preferably made of silicon rubber to insure proper low temperature operation. One side of the check valve is exposed to a positive pressure and a metal backing plate is necessary on the pressure side of the valve to prevent its collapse. With such an arrangement, the bond between the silicon rubber valve and the metal backing plate is most important and this invention is concerned with this phase of the check valve construction.

Accordingly, the principal object of this invention is to provide a check valve having an improved construction and bond of the backing plate and the flexible valve.

A further object of this invention is to provide a valve which is readily moldable; and one which is adjustable relative to its valve seat.

The novel features of this invention are set forth in the appended claims. The invention itself, together with additional objects and advantages thereof, will be more clearly understood from a reading of the following description in connection with the accompanying drawings wherein a preferred embodiment of this invention has been illustrated and in which:

FIG. 1 is a partial section view;
FIG. 2 is a top top plan view of the check valve;
FIG. 3 is a section view taken along lines 3—3 of FIG. 2;
FIG. 4 is a section view taken along lines 4—4 of FIG. 3; and
FIG. 5 is a perspective view of the backing plate.

Reliance is placed on our above identified co-pending application for a complete disclosure of the well system and for the purpose of setting the proper environment for this invention only that portion of the well system which extends above ground level 10 has been illustrated and will be described. Check valve 12 is connected to the end of a fitting 14 which is in turn connected to the end of pump discharge pipe 16. Check valve 12 is positioned in a chamber 18 from which a pipe 20 extends for delivery of water. When the pump is not operating water drains away from both sides of the check valve and settles in a pressurized storage tank (not shown) and pipe 20 extends into the tank so that a positive pressure is produced in chamber 18.

Turning now more specifically to the check valve, a generally cylindrical member 22 has an upper edge forming a generally annular valve seat 24 and also includes a lower flange 26. A collar 28 is threaded on fitting 14 and engages flange 26 to securely seat cylindrical member 22 on fitting 14 with O-ring 29 sealing the connection between member 22 and fitting 14. Cylindrical member 22 is preferably made of Teflon (tetrafluoroethylene) so as to provide a non-wettable valve seat which is particularly advantageous in low temperature applications in that it prevents the check valve freezing shut.

Check valve 12 also includes a valve assembly 30 having a generally circular valve portion 32 engageable with valve seat 24. In a manner to be described more fully hereinafter, valve portion 32 is connected to an adjustable mounting plate 34 through a flexible neck portion 36. Neck portion 36 provides a hinge about which valve portion 32 is movable into and out of engagement with valve seat 24. Valve portion 32 and hinge portion 36 are preferably integrally molded of silicon rubber which is particularly advantageous for low temperature operation in that it has good non-wetting properties and retains its flexibility at extremely low temperatures. Therefore, a check valve is provided which is operable over a wide range of temperatures.

As was stated above, when the pump of the well system is not operating, a positive pressure exists in the chamber 18. To prevent valve portion 32 from collapsing into member 22, a rigid metallic backing plate 38 is provided. Plate 38 also imparts sufficient rigidity to the valve to insure a positive seal-off at the check valve, this will perhaps be better appreciated when it is kept in mind that, unlike the usual check valve installations which are called upon to hold against water, this installation seals against air.

Preferably plate 38 is completely encapsulated in the silicon rubber. The plate is disk shaped to conform to the shape of valve seat 24 and is positioned in alignment with the valve seat. To facilitate molding, the plate is provided with a circular score mark 40 and three triangularly arranged apertures 42. In the molding operation, three needle point supports (not shown) are positioned in a suitable mold (not shown), the score mark is arranged to be engaged by the pins to properly orient the plate within the mold so that in the completed valve it will be properly aligned within the valve portion 32. The openings left by the support pins in the upper side of the valve are subsequently filled with silicon rubber to complete the encapsulation of backing plate 38. Apertures 42 facilitate the flow of silicon from one side of the plate to the other and furthermore mechanically maintain proper orientation of plate 38 within valve portion 32. However, it should be noted that a single non-circular aperture or any other arrangement of two or more apertures could also be used.

Accordingly, adherence of plate 38 to the valve is not dependent solely on the bond between the plate and the silicon rubber of the valve. On the contrary, the plate, being encapsulated, is virtually mechanically inseparable from the valve. Such an arrangement has, in addition to the already discussed advantages, the particularly desirable feature of reducing the volume of silicon rubber used while maintaining sufficient body to the valve to insure proper valve seal-off. Silicon rubber will take a set when subjected to a compressive load and its tendency to take a compressive set varies directly with the volume of silicon rubber being used. By molding the metal plate within the valve, the amount of silicon rubber is reduced, thereby reducing the tendency of the valve to take a compressive set which would adversely affect its ability to make a positive and effective seal-off.

Adjustable mounting plate 34 of valve assembly 30 is provided with two pairs of elongated apertures 44 and 46. A pair of screws 48 extend through apertures 44 and thread into collar 28 to connect the valve assembly in the check valve. Mounting plate 34 is movable on screws 48 in a direction parallel to the axis of cylindrical member 22 so that proper alignment between the lower face of valve portion 32 and the valve seat can be obtained to insure a good seal-off.

Extending downwardly from neck portion 36 is an integrally molded portion 50 which extends on both sides of mounting plate 34 and over apertures 46. Apertures 46 facilitate molding on both sides of mounting plate 34 and, having a portion of the silicon rubber molded therein, form a mechanical connection whereby mounting plate 34 is held in the desired position in the valve assembly 30. Molding of the valve assembly 30 is further facilitated through the provision of the two pairs of aligned, identical elongated holes 44 and 46 in that no particular care need be exercised in properly orienting the mounting plate in the mold since either pair of apertures can be used for the adjusting holes.

The discussion and illustration of this invention in connection with a particular preferred embodiment thereof has been intended for illustrative purposes only and should not be taken by way of limitation. Accordingly, it is intended in the appended claims to cover all modifications and embodiments of this invention as fall within the true spirit and scope thereof.

What we claim is:

1. A check valve comprising, in combination, an annular valve seat of tetrafluorethylene, a valve of silicon rubber having a face normally in engagement with said valve seat and a neck portion forming a hinge for movement of said face into and out of engagement with said valve seat, a metallic disk molded within and completely surrounded by said silicon rubber, said metallic disk being in substantial alignment with said valve seat, a mounting plate including two pairs of aligned elongated apertures and having said silicon rubber extending on either side of said mounting plate and through one of said pairs of apertures, and fastening means disposed in the other of said pairs of apertures for connecting said valve for adjustable movement relative to said valve seat.

2. The combination of claim 1 wherein said metal disk includes means having at least one aperture extending through said disk for holding said disk in position relative to said valve, and wherein said disk includes a generally annular indentation in one face thereof.

3. A check valve comprising, in combination, an annular valve seat of tetrafluorethylene, a valve of silicon rubber having a face normally in engagement with said valve seat, means for connecting said valve for movement into and out of engagement with said valve seat, a metallic disk molded within said valve and completely surrounded by said silicon rubber, a mounting member including two pairs of aligned elongated apertures and having said silicon rubber extending on either side of said mounting plate and through one pair of said apertures, and means disposed in said other pair of apertures for connecting said valve for adjustable movement relative to said valve seat.

4. A check valve comprising, in combination, an annular valve seat of non-wettable material, a valve of flexible material having the properties of retaining flexibility at temperatures considerably below freezing, said valve having a face normally in engagement with said valve seat and a neck portion forming a hinge for movement of said face into and out of engagement with said valve seat, a metallic disk molded within and completely surrounded by said flexible material, said metallic disk being in substantial alignment with said valve seat, a mounting plate including two pairs of aligned elongated apertures and having said flexible material extending on either side of said mounting plate and through one of said pairs of apertures, and fastening means disposed in the other of said pairs of apertures for connecting said valve for adjustable movement relative to said valve seat.

5. The combination of claim 4 wherein said metal disk includes means having at least one aperture extending through said disk for holding said disk in position relative to said valve, and wherein said disk includes a generally anular indentation in one face thereof.

6. A check valve comprising, in combination, an annular valve seat, a valve of flexible material having a face normally in engagement with said valve seat, means for connecting said valve for movement into and out of engagement with said valve seat, a metallic disk molded within said valve and completely surrounded by said flexible material, a mounting member including two pairs of aligned elongated apertures and having said flexible material extending on either side of said mounting plate and through one pair of said apertures, and means disposed in the other of said pairs of apertures for connecting said valve for adjustable movement relative to said valve seat.

References Cited in the file of this patent

UNITED STATES PATENTS

| | | |
|---|---|---|
| 1,956,691 | McCune | May 1, 1934 |
| 2,159,484 | Levy | May 23, 1939 |
| 2,730,115 | Hempel | Jan. 10, 1956 |
| 2,793,654 | Bierman | May 28, 1957 |
| 2,946,554 | Asker | July 26, 1960 |
| 2,974,681 | Whitehurst | Mar. 14, 1961 |